United States Patent

Marvosh

[15] 3,653,113
[45] Apr. 4, 1972

[54] MACHINE FOR MAKING TABLETOPS

[72] Inventor: Daniel Marvosh, 3085 East Clarmeya Lane, Pasadena, Calif. 91107

[22] Filed: Jan. 26, 1970

[21] Appl. No.: 5,672

[52] U.S. Cl. .............................. 29/208 D, 144/144, 144/154
[51] Int. Cl. .......................................... B23p 19/04, B27c 5/00
[58] Field of Search ................... 29/208 D, 208, 211 D, 211, 29/208 C; 144/144, 154

[56] References Cited

UNITED STATES PATENTS 2,599,712   6/1952   Izen .......................................... 144/144
3,221,401   12/1965  Scott et al. ............................. 29/208 D

*Primary Examiner*—Thomas H. Eager
*Attorney*—Whann & McManigal

[57] ABSTRACT

The application discloses a machine with a motor-driven rotatable work support, separate shaping, grooving and banding tools mounted on doubly pivoted arms for performing operations on a workpiece mounted on the support, and automatic means for controlling the speed of rotation of the work support in accordance with a predetermined pattern coordinated with the shape of work to be formed, and automatic means for controlling the movement of the pivoted arms.

3 Claims, 12 Drawing Figures

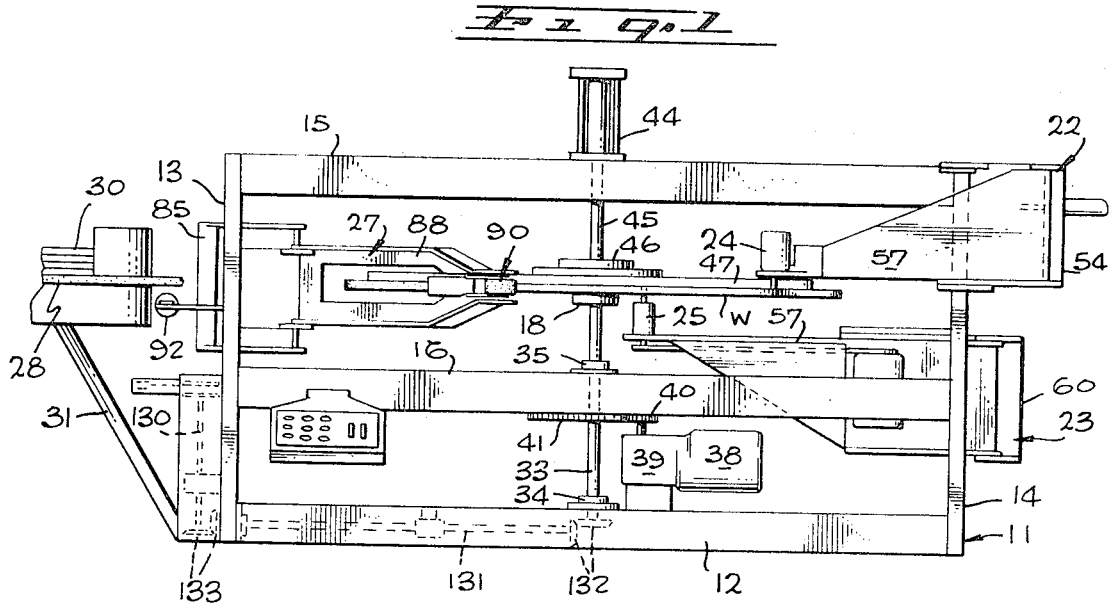
Fig. 1
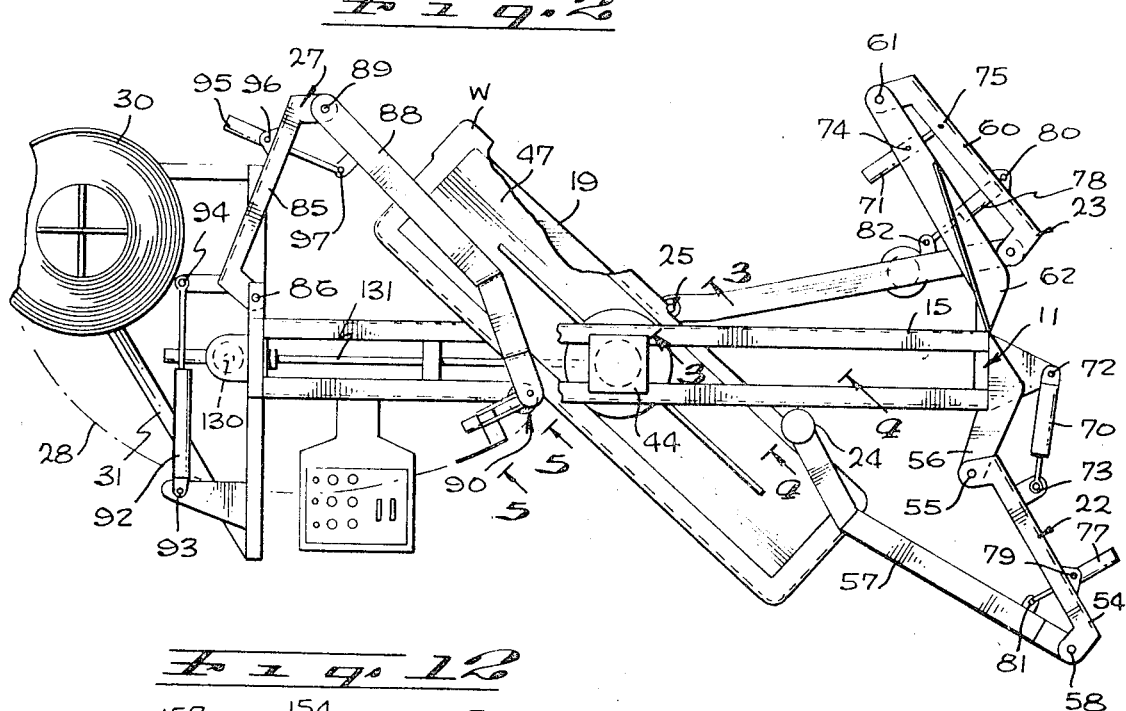
Fig. 2
Fig. 12
INVENTOR.
DANIEL MARVOSH
BY
Mason Graham
ATTORNEY

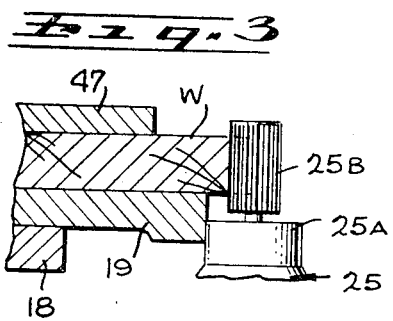
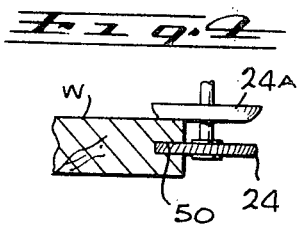
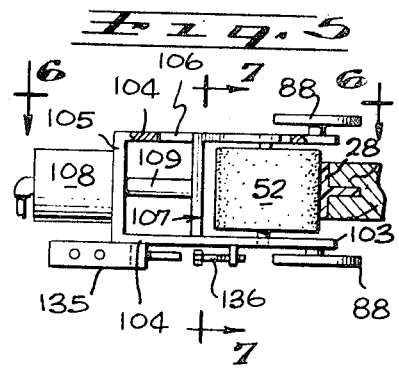
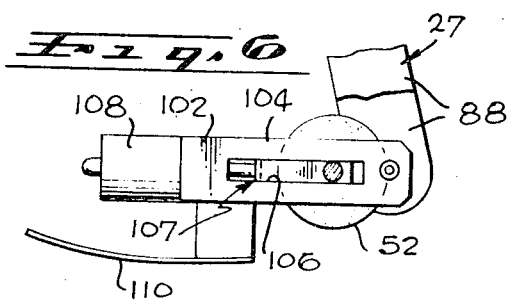
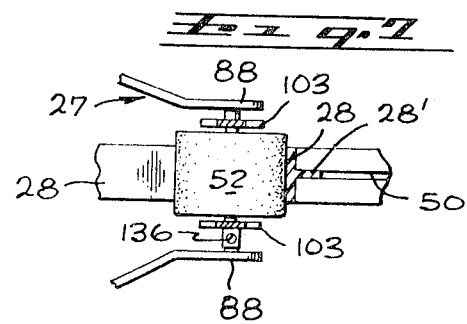
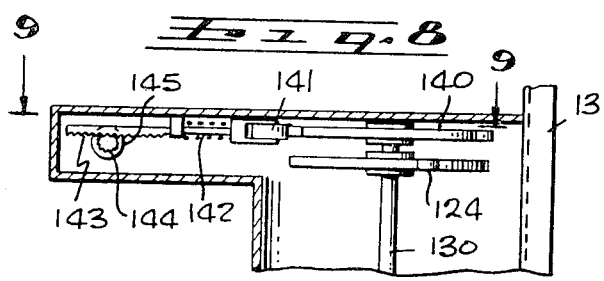
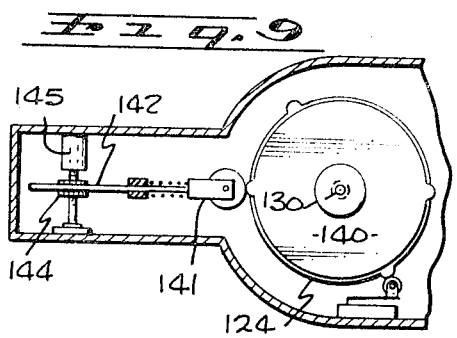
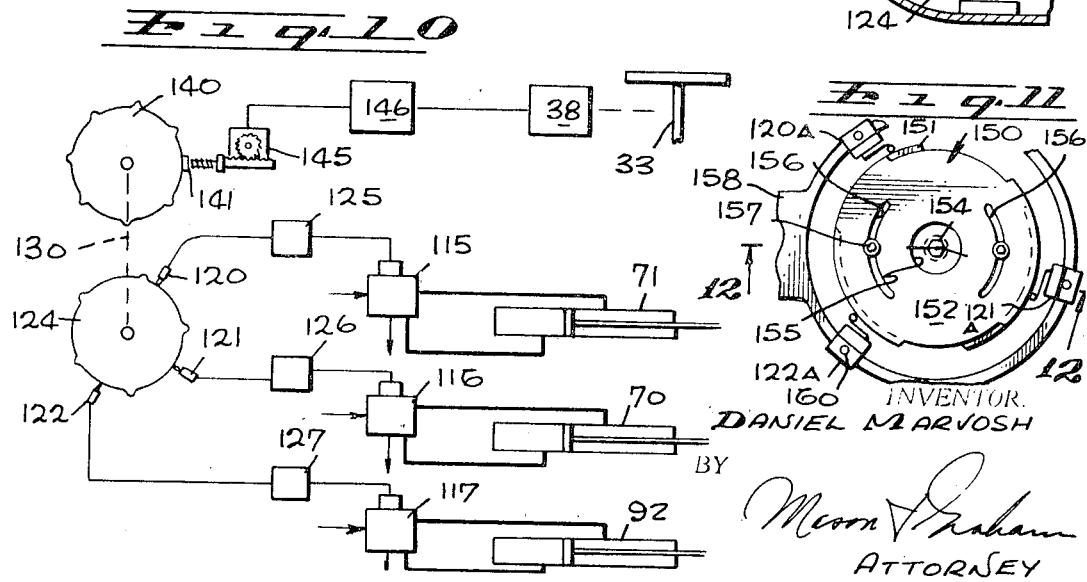
INVENTOR.
DANIEL MARVOSH
BY
Mason Graham
ATTORNEY 3,653,113

MACHINE FOR MAKING TABLETOPS

This invention has to do with the shaping and banding of wooden tabletops and the like.

For certain uses wooden tabletops and similar articles are banded at the edge with a metal or plastic strip usually having an internal rib that is received in a groove provided in the table edge. An object of the invention is to provide a new and improved machine for shaping, grooving and banding wooden blanks to form articles or products useful as tabletops of the type described and for other applications.

Another object is to provide a unique mounting for a banding roller adapted to force or roll the banding strip into the grooved edge of the formed table blank in order to better control the roller as the same progresses around the blank, particularly in rounding corners. In this connection it is an object to provide a yieldable roller mounting which acts to control the fluid pressure to one or more other parts of the mounting assembly on which the roller is mounted.

These and other objects will be apparent from the drawings and the following description. Referring to the drawings:

FIG. 1 is a front elevational view of a machine embodying the invention;

FIG. 2 is a plan view;

FIG. 3 is a fragmentary sectional view on line 3—3 of FIG. 2, but on a larger scale;

FIG. 4 is a fragmentary sectional view on line 4—4 of FIG. 2, but on a larger scale;

FIG. 5 is a fragmentary sectional elevation on line 5—5 of FIG. 2, but on a larger scale;

FIG. 6 is a fragmentary plan view on line 6—6 of FIG. 5;

FIG. 7 is a sectional view on line 7—7 of FIG. 5;

FIG. 8 is a fragmentary sectional elevational view on line 8—8 of FIG. 2, but on a larger scale;

FIG. 9 is a fragmentary sectional view on line 9—9 of FIG. 8;

FIG. 10 is a schematic representation of certain portions of the automatic control system;

FIG. 11 is a plan view of an adjustable cam and microswitch assembly; and

FIG. 12 is a sectional view on line 12-12 of FIG. 11.

More particularly describing the invention, in general the machine includes a main frame 11 having a base 12, two upright end posts 13 and 14, respectively, an upper bridging member 15, and an intermediate bridging member 16. Centrally mounted in the machine is a rotary table or turntable 18 upon which a pattern 19 of the table to be formed and a workpiece W are mounted. Carried by the frame 11 are shaper means for forming the workpiece into a shape proportional to that of the pattern and grooving means for cutting a band receiving groove in the edge of the workpiece as formed by the shaping means. The shaper and grooving means comprise means for holding a plurality of work engaging tools shown as two tool-supporting arm assemblies, designated generally by 22 and 23, which are mounted on post 14. The uppermost of these 22 carries a motorized grooving tool 24 for the purpose of forming a groove in the edge of the shaped tabletop or workpiece and the other 23 carries a motorized shaper 25 that first serves to cut the workpiece to the desired contour.

A banding means in the form of a bander arm assembly, designated generally by 27, mounted on end post 13, serves to press an edging strip 28 onto and into the edge of the formed and grooved workpiece. The edging strip is carried on a reel 30 mounted on a framework 31.

Turntable 18 is fixedly mounted upon a vertical shaft 33 that is journaled in the members 12 and 16 of the frame in any suitable manner, bearings 34 and 35 being shown for the purpose. An electric motor 38 rotates the shaft through a suitable drive train which includes gear reduction means 39, and gears 40, 41. An appropriate template or pattern 19 is detachably mounted on the turntable as by means of screws (not shown). For the purpose of quickly mounting the workpiece W on the turntable, I provide a conventional fluid ram 44, the piston rod 45 of which is fitted with a head 46 to accommodate a suitable holddown plate 47 which bears directly upon the upper surface of the workpiece.

Generally, in the operation of the apparatus, the turntable and hence the workpiece are rotated at a relatively slow speed and the shaper 25, which is guided by a portion 25A that engages the edge of the template 19, as shown in FIG. 3, cuts the workpiece to the desired contour with the cutter element 25B. The groove cutter 24 follows the shaper, cutting a groove 50 in the edge of the workpiece where this is required, being guided to form the groove at the required distance from the top of the work by a shoe or guide 24A. A banding wheel 52 on the banding arm assembly 27 follows the groover and serves to press the edging or banding strip 28 against the edge of the workpiece, the banding strip normally having a rib 28' which is pressed into the groove 50 in the edge of the workpiece. Where tongueless types of banding strips are used the cutter 24 may be dispensed with.

As previously noted, the groove cutter 24 and shaper 25 are supported upon separate arm assemblies, designated 22 and 23, respectively. Assembly 22 comprises a main arm 54 which is pivotally mounted at 55 on a bracket 56 fixed to end post 14 and an outer arm 57 pivotally mounted at 58 on the outer end of the main arm. Arm 57 carries the motorized grooving cutter 24 at its free end.

Assembly 23 includes a main arm 60 that is pivotally mounted at 61 on a bracket frame 62 fixed to end post 14. An outer arm 64 is pivotally mounted at 65 on arm 60 and carries the shaper head 25 and a motor 66 therefor, a belt drive 67 connecting the two.

It should be noted that the pivotal axes 55 and 61 of the main arms 54 and 60, respectively, are equidistant from the axis of rotation of the table 18. A plurality of fluid operated means interconnect the arms of the tool supporting arm assemblies and serve to move the tool holding extremities of the arms into operative juxtaposition with the workpiece in a spaced relationship with the template or pattern. The two main arms are individually controlled and actuated by double-acting piston-cylinder units, designated 70 and 71 respectively. Unit 70 is connected between a point 72 of the frame and an intermediate point 73 on the arm. Unit 71 is connected between a point 74 on the frame and an intermediate point 75 on the arm. Also, each of the outer arms is actuated or swung with reference to its associated main arm by means of a piston-cylinder unit, these being designated by numerals 77 and 78 respectively. In this case the cylinders of the units are pivotally attached to the main arms at 79 and 80 respectively, while the piston rods of the units are connected to the arms at 81 and 82 respectively.

It is contemplated that a suitable pressure fluid system, preferably operated on compressed air, be provided and any desired conventional system can be used. However, it is a feature of the invention that the two arm assemblies 22 and 23 be controlled furing operation of the machine to swing the arms to the most advantageous position with reference to the edge of the rotating table which is being machined. While this can be accomplished by an operator through manual controls, I prefer to provide means for automatically controlling the positions of the main arms 54 and 60 as well as the main arm of the bander arm assembly to be described.

As previously pointed out, the machine is also designed to apply a banding strip 28 to the edge of the workpiece following the shaping and grooving thereof and for this purpose is provided with the arm assembly 27. The latter comprises a main arm 85 pivotally mounted at 86 on the post 13. The pivotal axes 55, 61 and 86 of the main arms 54, 60 and 85, respectively, are equidistant from the axis of rotation of the turntable 18. An outer arm 88, which is bifurcated throughout most of its length as seen in FIG. 1 to pass the revolving work, is pivotally mounted at 89 on the outer end of arm 85 and carries a banding roller assembly 90. A plurality of fluid operated means are provided for moving the band roller assembly into operable engagement with the workpiece and for urging the band into engagement with the edge of the workpiece. Arm 85 is actuated by a piston-cylinder unit 92 that is connected between a point 93 on the frame and a point 94 on the arm. A piston-cylinder unit 95 is pivotally mounted on arm 85 at 96 and is connected to arm 88 at 97. The arm assembly 27 thus is substantially the same as arm assembly 22 previously described and basically the same as arm assembly 23.

At its outer or free end arm, assembly 27 carries the banding roller assembly 90 which includes roller 52. A roller support frame 102, which is pivotally mounted on trunnions 103 at the end of arm 88, comprises a U-shaped body having two parallel legs 104 connected by an end wall 105. The legs are each slotted longitudinally at 106 to receive a U-shaped roller carrier 107. The latter is normally pressed forward by a piston-cylinder unit 108 mounted on the end of frame 102 and having a piston rod 109 which is connected to the roller carrier 107. A guide 110 is provided on the support for the incoming banding strip 28.

The purpose of the double arm mountings for the shaper and the grooving cutter and the banding roller is to provide means of obtaining the best desirable angle between the outer arm and the workpiece being formed as the workpiece rotates. With prior structures this has presented a considerable problem especially where it has been desired to form elongated rectangular tabletops and the like. As previously indicated, any suitable control system may be used for operating the arm assemblies 22, 23 and 27 and I find that a manually controlled system of conventional type is suitable for controlling the piston-cylinder units connected between the inner and outer arms of each assembly. However, I prefer to automatically control the piston-cylinder units between the frame and the respective main arms and, by way of example, referring to FIG. 10, I show diagrammatically one way this may be accomplished.

In FIG. 10, numerals 115, 116 and 117 represent four-way solenoid-controlled valves connected with the cylinders of units 71, 70 and 92, respectively. Each valve is controlled by a microswitch, these being designated 120, 121 and 122, respectively, responsive to a cam 124 driven in synchronism with the turntable shaft 33. The numerals 125, 126 and 127 designate conventional power relay circuit means interposed between the microswitches and the valves. The cam 124 is shown mounted on a shaft 130 journaled at the end of post 13. The shaft is driven from the main shaft 33 through the medium of a countershaft 131 and gearing 132 and 133.

With the system outlined and assuming that the microswitches can be adjustably positioned with respect to the cam 124 and that either different cams or adjustable cams may be used for different patterns of workpieces to be formed, the cam 124 and associated microswitches 120, 121 and 122 can serve to control the piston cylinder units 71, 70 and 92, respectively, that in turn control the positions of the main arms 60, 54 and 85 of the three arm assemblies. Preferably the other piston cylinder units are connected in a conventional system for manual control. Thus it is possible to obtain the most desirable angle of the main arm with respect to the workpiece as the same rotates.

In operation, the various arm assemblies are urged toward the work, however, it is a feature of the invention that I provide means for relieving the pressure applied to the arm 15 which carries the banding roller when the forces against the roller are such as to cause it to retract in its mounting, that is, be forced back against the gaseous fluid under pressure maintained in cylinder 108. This is accomplished by a valve 135 which overrides or controls the piston-cylinder unit 95 of the arm assembly, the valve being mounted on the side of the frame 102 and in position to be actuated by an adjustable screw 136 carried by the roller carrier 107. Thus under certain circumstances when the pressure against the roller becomes excessive, due to the shape of the piece being banded and the roller traversing a corner, for example, the pressure in the cylinder of unit 95 will be relieved and the arm 88 can retract.

While I have shown a resilient banding roller which may be made of plastic or rubber, I contemplate that in some instances, as where a banding strip without a tongue but having a pressure-sensitive adhesive is applied to the workpiece, the banding roller may be replaced by a heated shoe.

Another feature of the invention is the provision of means for automatically controlling the speed of rotation of the turntable so that its rotation may be slowed as the cutter forms a corner of small radius on a table or the like and as each of the other tools rounds a corner. This is accomplished by providing a special cam 140 on the shaft 130 and by having a cam follower 141 carried on a spring-biased shaft 142 having rack teeth 143 meshing with a pinion 144 on the shaft of a potentiometer 145. The latter is connected in a conventional motor control circuit 146 for the main drive motor 38 to control the speed of the motor. Thus, by coordinating the cam with the workpiece pattern, the rotation of the work can be slowed automatically as each tool reaches and rounds a sharp corner of a generally rectangular or polygonal tabletop or the like being formed. It is to be understood that the cam 140 is merely schematically shown and no attempt has been made to approximate the true shape such a cam might take. Also, it may only be necessary to slow the speed of rotation of the turntable for the shaper as it traverses the end portions of an extremely elongated workpiece.

In FIGS. 11 and 12 I show an adjustable cam and microswitch assembly which can be used in place of the cam 124 and associated microswitches shown in FIG. 10. Here, numeral 130A designates a shaft driven by or in synchronism with the turntable. An adjustable cam 150 is mounted on this which includes a lower disk 151 and an upper disk 152. The lower disk is secured to the shaft in correct rotational adjustment correlated to the work on the turntable by a screw 154. The upper disk, which has a central hole 155 to freely receive the screw 154, has circumferential slots 156 receiving screws 157 in the lower disk, thereby permitting considerable circumferential adjustment of the disks relative to each other. Microswitches 120A, 121A and 122A are mounted around the cam on a support 158 concentric with the cam and are adjustable circumferentially of the cam, being securable by screws 160. With this arrangement, the two parts of the cam can be correlated to the pattern of the particular work to be formed and the microswitches correlated with respect to the cam, the work, and the location of the arms which they indirectly control as shown in FIG. 10.

I claim:

1. In a machine for forming a wooden tabletop or the like, a frame, a power-driven turntable rotatably carried by the frame and adapted to support a flat workpiece to the edge of which a band strip is to be applied, arm means pivotally mounted at one end on said frame for swinging movement about an axis parallel to the axis of rotation of said turntable, a roller support carried on the free end of said arm means for limited movement, a banding roller rotatably mounted in said support and adapted to run against a banding strip being applied to the workpiece, means yieldably urging said roller support outwardly of said arm means to firmly engage a banding strip and press it into place on the edge of the workpiece, means for yieldably urging said arm means toward the turntable in a direction to move said banding wheel toward a workpiece on the turntable, and means actuated by rearward movement of said roller support for partially relieving the force yieldably urging said arm means in a direction to move the banding wheel toward the workpiece.

2. The machine set forth in claim 1 in which the means yieldably urging said roller support and the means yieldably urging said arm means each comprise a piston-cylinder unit, and in which the means actuated by rearward movement of the roller support comprises a valve connected in a fluid circuit controlling the piston-cylinder unit of the means yieldably urging said arm means toward the workpiece.

3. The machine set forth in claim 2 in which said roller support is mounted on said arm means for pivotal movement about an axis parallel to the axis of rotation of said roller and located therebeyond with respect to the swinging axis of said arm.

* * * * *